March 11, 1952  J. GLASSMAN  2,588,823
RUBBER FOAM CUSHION
Filed April 25, 1949
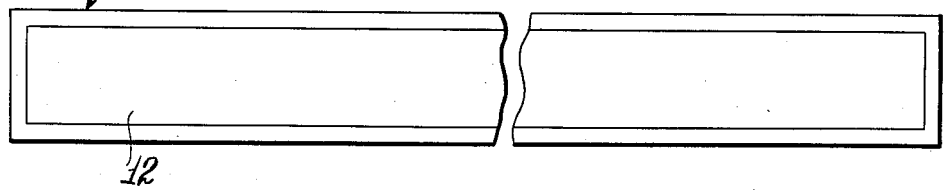
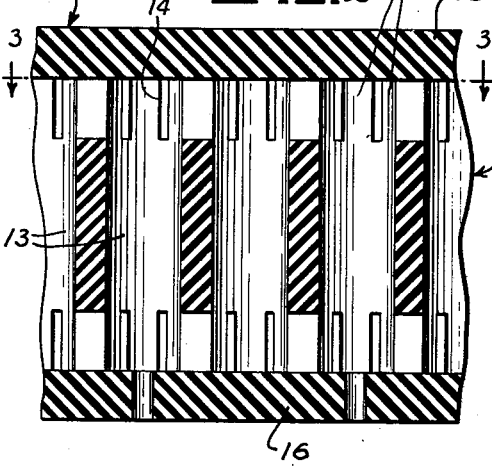
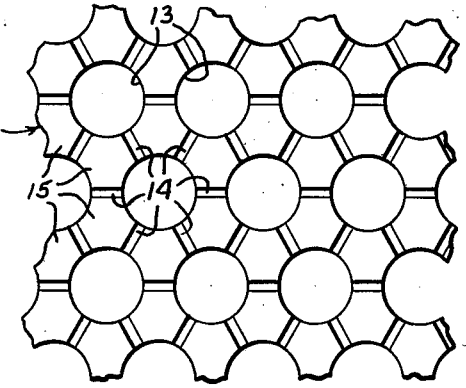
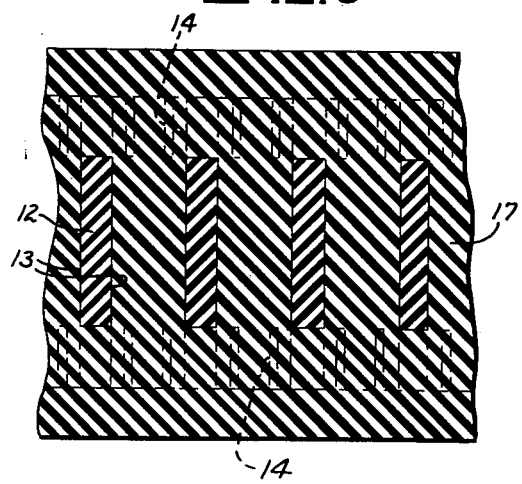
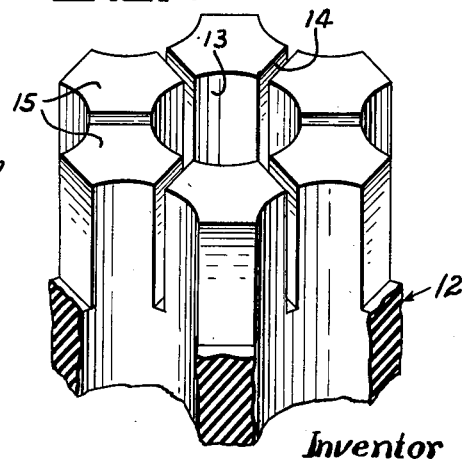
Inventor
Jacob Glassman
atty.

Patented Mar. 11, 1952

2,588,823

UNITED STATES PATENT OFFICE 2,588,823

RUBBER FOAM CUSHION

Jacob Glassman, Chicago, Ill.

Application April 25, 1949, Serial No. 89,538

2 Claims. (Cl. 5—361)

The invention relates to improvements in cushioning material and more particularly in the novel construction of a rubber foam cushion embodying integral portions having different load carrying capacities.

Cushions made from rubber foam, naturally or artificially obtained, have substantially uniform compressibility throughout their areas when subjected to a load. Because of this condition such cushions are not entirely satisfactory, especially when used as a mattress. Under a heavy load, as for example the weight of the medial portion of a body lying thereon, certain areas thereof may actually "bottom" against the supporting surface. This results in dishing the adjacent areas in the direction of the "bottomed" area in such manner as to leave portions of the body unsupported. Various attempts to overcome this condition have not been entirely satisfactory; for example, rubber foam mattresses frequently are provided with cavities and, in some instances, the walls of these cavities are reinforced with rubberized fabric while in other instances rubber plugs are placed in the cavities. Each of these structures is makeshift at best and they have failed to prevent dishing when pressure is applied in local areas primarily because of their integral surface structure.

The present invention overcomes the tendency of a mattress or other cushion fashioned from rubber foam to dish and, consequently, affords an adequate resilient support for all areas of a load irrespective of how irregularly the load may be distributed. This is best accomplished by providing a rubber foam cushion with a resilient core of greater bulk density than the enveloping rubber foam. This core is fashioned with many free upstanding finger-like projections or columns which may be completely embedded in a rubber foam of less bulk density or may be adhesively secured at their free outer ends to a covering sheet of rubber foam or the like. In either event, the individual columns provide local supporting members and the cushion as a whole is not materially distorted or "dished" by uneven load pressures. Instead, it is capable of compressing sufficiently in local areas to compensate for an unevenly distributed load without "dishing" in adjacent areas. As a result, the load is adequately supported over its entire area.

It is, therefore, an object of the present invention to provide a rubber foam cushion with a rubber core of greater bulk density than the enveloping rubber foam.

Another object of the invention is to provide a core for a rubber foam cushion with a plurality of spaced fingers or columns projecting freely from either or both faces thereof.

Another object is to provide a rubber foam cushion having a plurality of relatively free upstanding resilient fingers or columns of greater bulk density embedded therein.

Other objects of the invention will appear from the following description and accompanying drawing and will be pointed out in the annexed claims.

In the accompanying drawing there has been disclosed exemplary structures designed to carry out the various objects of the invention, but it is to be understood that the invention is not confined to the exact features shown as various changes may be made within the scope of the appended claims.

In the drawing:

Fig. 1 is a longitudinal vertical sectional view of a mattress embodying the features of the present invention.

Fig. 2 is an enlarged fragmentary sectional detail view of the mattress shown in Fig. 1.

Fig. 3 is a fragmentary plan view of the core, taken substantially on line 3—3 of Fig. 2.

Fig. 4 is a fragmentary perspective view of the core.

Fig. 5 is a fragmentary sectional detail view, similar to Fig. 2, but showing a modified form of construction.

Referring particularly to the embodiment of the invention best illustrated in Figs. 1 through 4, inclusive, the cushion may take the form of the mattress 11 illustrated in Fig. 1. It should be obvious, however, that the cushion material constituting the mattress 11 is equally useful in any type of cushion such as for example chair seats or the like.

The cushion includes a core 12 which is in the form of a flat body of rubber foam of a predetermined bulk density. The core is provided with a plurality of cavities 13 extending perpendicular to and opening upon each face of the core 12. The cavities preferably are arranged in rows with the cavities of adjacent rows offset as shown. Clearly these cavities may be provided otherwise than as shown. For example, they may include a partition wall between their ends so as to increase the structural strength of the core. The cavities 13 facilitate ventilation of the finished cushion and also serve a purpose that will become apparent as the description proceeds.

"Dishing" under local area loads, which is avoided by the present construction, will occur to a limited extent even when a cushion is provided with cavities 13. In view of this, applicant has provided each face of the core 12 with a plurality of intersecting grooves or slots 14 of substantial depth, which grooves open into the cavities in the manner best illustrated in Figs. 3 and 4. The presence of the intersecting grooves 14 and cavities 13 provides each face of the core 12 with a plurality of self-supporting finger-like protuberances or columns 15. These columns preferably have a length substantially equal to approximately one-third of the overall thickness of the core 12 although it is evident that their length may vary to suit different problems of use.

It should be evident at this time that a core formed of rubber, preferably rubber foam, and provided with a plurality of closely spaced but independent finger-like protuberances on one or both faces thereof, is capable of compression in local areas without causing substantial dishing of surrounding areas of the core. Although the core disclosed herein is useful as a cushion without the inclusion of additional structural media, it is intended primarily to be embodied in the construction of a cushion formed of rubber foam having a bulk density less than that of the core. To this end the core 12 is provided on its upper and lower faces with a sheet of rubber foam 16 which is secured, adhesively or vulcanized, to the free ends of the finger-like protuberances 15. The sheet 16 is, in the present instance, made of rubber foam having less bulk density than the bulk density of the core 12.

The difference in the bulk densities of the sheet and core is effective to permit the finger-like protuberances 15 to resist compression to a greater degree than the sheet 16. As a consequence, placing a load upon a local area of the cushion will result in compression of the load carrying portion of the sheet 16 and the underlying finger-like protuberances 15 without materially distorting or compressing the finger-like protuberances in areas adjacent to the local area under load. Less bulk density of the sheet 16 enables the sheet 16 to stretch under local loads sufficiently to resist any tendency of said sheet to be drawn downwardly or "dished" in the surrounding areas adjacent to the load carrying area.

In the construction illustrated in Fig. 5, the core 12 is molded in and is thereby completely enclosed within a body of rubber foam 17 of less bulk density than the bulk density of the core. Such molding of the core in the manner described is obtained by placing the core in a mold suitably provided with means to support the core spaced from all walls of the mold. Rubber foam, either natural rubber or rubber artificially obtained, is dispersed into the mold and, when set, is vulcanized so as to form a homogeneous structure wherein the perpendicular cavities 13 and recesses 14 are filled with rubber foam and the core is embedded within a layer of such foam in the manner illustrated. Any application of a load in a local area of a cushion of the kind shown in Fig. 5 will result in compression of the cushion in the area of the load only without material "dishing" of areas surrounding said local area. This of course results from the presence, within the cushion, of the columns 15 which will resist compression or distortion unless a load is located directly thereon.

Although applicant has shown several embodiments of his invention in the accompanying drawing, and has described their structures in detail in the foregoing specification, it should be fully understood that the invention is concerned primarily with the provision of a cushion composed of rubber foam having different bulk densities, and specifically to the core thereof, so as to adequately support a load on a local area thereof and prevent "dishing" in surrounding areas. It should be understood further that the invention is capable of embodying modifications in detail construction without departing from the spirit of the invention or the scope of the appended claims.

I claim:

1. Cushioning material which comprises a flat body of rubber foam having a plurality of openings therethrough, and at least one surface of the body having deep grooves formed therein and connecting adjacent openings, said grooves defining a plurality of finger-like protuberances surrounding each opening.

2. Cushioning material which comprises a flat core of rubber foam having a plurality of openings therein extending from face to face and a plurality of intersecting slots perpendicular to both faces dividing the region of the core in proximity to said faces into a plurality of finger-like protuberances surrounding each opening, and a mass of rubber foam of different density enveloping said core and filling the spaces in the openings and slots.

JACOB GLASSMAN.

REFERENCES CITED

The following references are of record in the file of this patent:

UNITED STATES PATENTS

| Number | Name | Date |
|---|---|---|
| 1,618,165 | Buschelli | Feb. 22, 1927 |
| 2,150,747 | Naulty | Mar. 14, 1939 |
| 2,167,178 | Kohlstadt | July 25, 1939 |
| 2,199,006 | Minor | Apr. 30, 1940 |
| 2,434,641 | Burns | Jan. 20, 1948 |

FOREIGN PATENTS

| Number | Country | Date |
|---|---|---|
| 389,833 | Great Britain | Mar. 20, 1933 |
| 476,678 | Great Britain | Dec. 8, 1937 |